United States Patent Office 3,108,207
Patented Oct. 22, 1963

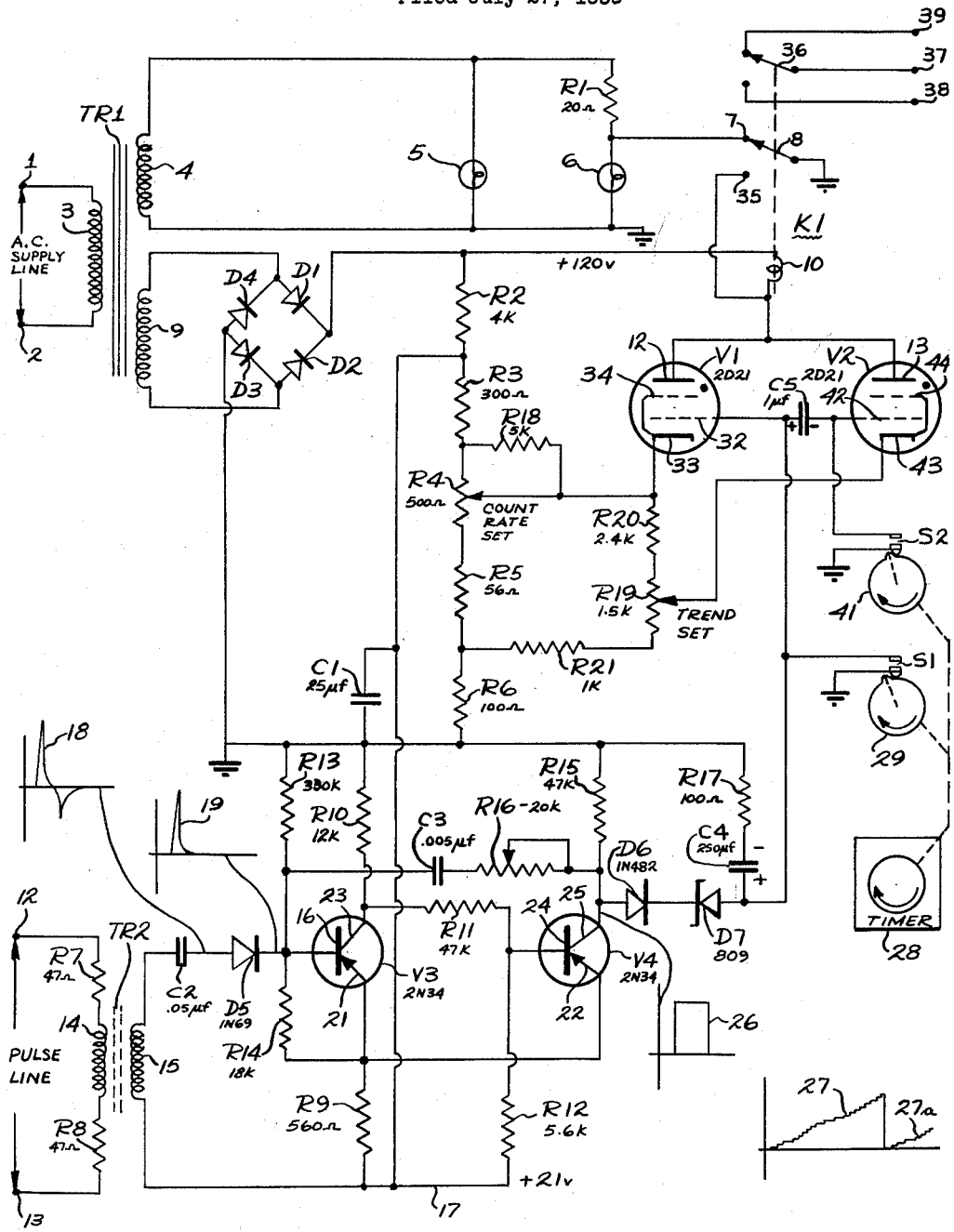

3,108,207
COUNT RATE AND TREND MONITORING
SYSTEM
Lambert Haner, Lakewood, and David J. Dolan, Chesterland, Ohio, assignors to Avtron Manufacturing, Inc., a corporation of Ohio
Filed July 27, 1959, Ser. No. 829,598
8 Claims. (Cl. 317—149)

This invention relates to a system or circuit for measuring a count rate and the trend in the count rate where the count is reported to the system as a sequence of electrical impulses. The trend is the rate of change of the count rate; for the present purpose it may be taken as the rate at which the count rate is increasing. The count trend is a factor which may be of significance equal to or greater than the absolute value of the count rate at any given time.

The present rate and trend monitoring system is of general utility wherever it is desired to keep track of recurring events and of the trend therein. It is particularly useful in the monitoring of nuclear radiation as in area monitoring, process control or failure detection. Area monitoring may be practiced for instance in laboratories and hospitals, or in plants and reactor areas wherever radiation producing materials or equipment are used, in order to guard against a potentially dangerous rise in the radiation level at any given place. In such applications, the count trend, that is the fact that the count rate is rising unusually rapidly, may be even more important than the absolute value of the count rate. This may apply equally to process control where for instance a radioisotope of short half life may be dispersed in other materials being processed, and the radiation therefrom monitored to provide a measure of the rate of flow or reaction of such other materials. Likewise in failure detection of reactors or nuclear equipment, a measure of the trend in the count rate is frequently desirable.

In an area monitoring installation, there are many individual detectors strategically placed at remote locations and reporting dose or count rates to a control center. The individual detectors provide pulses proportional in repetition rate to radiation intensity and may consist of Geiger-Müller tubes, scintillation counters or boron fluoride proportional counter tubes. The count rate is reported to the control center as a series of electrical impulses transmitted by wire. At the control center, separate receivers or count rate and trend monitoring circuits may be provided for each detector. Each of these receivers must be capable of producing an indication or giving an alarm based upon an excessive rise in the count rate or upon an excessive rise in the trend, that is, in the rate of increase of the count rate. Alternatively, or in addition, a single central monitoring receiver may be used with an automatically timed stepping switch for presenting to it successively and for a predetermined time period, the output of each individual detector in turn. Such a central monitoring receiver may be coupled to a digital counter and printer for printing a permanent record of the count rate and of the channel or detector on which the count was taken along with the time of day.

The waveform characteristics such as the amplitude and time duration of the electrical pulses supplied by the various detector units may vary with the count rate. Also they may vary from time to time with the condition of the individual detector unit, or from unit to unit. Therefore it is necessary that the monitoring receiver tolerate or compensate for such variations.

Accordingly the general object of the invention is to provide a new and improved monitoring receiver or system responsive to count rate and to the trend in the count rate.

Another object of the invention is to provide an improved monitoring circuit characterized by its simplicity and reliability and by its independence of the waveform of the electrical pulses supplied to it.

A more specific object of the invention is to provide such a monitoring circuit which will given an indication or provide an alarm whenever the count rate exceeds a predetermined level and whenever the count trend or rate of increase in the count rate rises above a given value.

In accordance with the invention, the input pulses, after suitable shaping or stabilizing in waveform if necessary, are supplied to a count condenser for predetermined charging periods. If, as a result of an excessive count rate, the charge on the count condenser rises above a preset level during the period, an alarm is set off. Just before the end of the period, the charge on the count condenser is transferred to a copy condenser. During the next charging period, if, as a result of an excessive count trend, the charge on the count condenser rises in excess of a preset level over the charge on the copy condenser stored from the previous charging period, the alarm is likewise set off.

In a preferred system embodying the invention, the input pulses are regenerated by a monostable transistor amplifier circuit which stabilizes them as to waveform. The stabilized pulses are supplied to a totalizing circuit comprising in series a forward flow diode, a zener diode, and count condenser. The forward flow diode prevents discharge of the count condenser, and the zener diode prevents leakage or open-circuit collector current from charging the count condenser between pulses. The charge on the count condenser is allowed to accumulate for a predetermined charging period, and then a switch controlled by a timer discharges it and the cycle repeats. If the charge rises above a preset level at any time, a gas thyratron tube is triggered and sets off an alarm or indicator relay.

Just before the end of the charging period, the count condenser is connected to a copy condenser which charges up to the terminal value of the count condenser. The copy condenser is connected in series with the count condenser between control electrode and cathode of a second thyratron. The charge on the copy condenser opposes that on the count condenser. However if the trend is rising, the charge on the count condenser will exceed that stored in the copy condenser from the previous charging period and, upon exceeding a present level, trigger the second thyratron and set off the alarm.

For further objects and advantages and a better understanding of the invention, attention is now invited to the following description and accompanying drawing. The features of the invention believed to be novel will be more particularly pointed out in the appended claims.

The single FIGURE of the drawing illustrates schematically a count rate and trend monitoring circuit embodying the invention in preferred form.

Referring to the drawing, the circuit is energized from a suitable alternating current supply at line terminals 1, 2 leading to primary winding 3 of transformer TR1. Secondary winding 4 provides 6.3 volts to a green indicator lamp 5 indicating that the monitoring circuit is turned on, and may also energize a red indicator lamp 6 to indicate that the count rate or count trend are excessive. This lamp is connected in series with resistor R1 and the lamp is normally short-circuited to ground through terminal 7 and contactors 8 of relay K1. When the relay is energized, the short-circuiting connection is opened and lamp 6 goes on.

Secondary winding 9 of transformer TR1 supplies 120 volts A.C. to a bridge rectifier comprising diodes D1 to D4 connected in a conventional full-wave rectifying circuit. The unfiltered full voltage output of the bridge rectifier is supplied directly through operating coil 10 of relay K1 to anodes 12, 13 of thyratron tubes V1, V2. The output of the bridge rectifier is also applied across a voltage divider comprising resistances R2 to R6. The output at the junction of resistances R2 and R3 is approximately +21 volts and is smoothed by filter capacitor C1 and used to energize the monostable transistor circuit comprising PNP type transistors V3, V4.

The pulses representing the radiation or other phenomena whose count rate and trend are to be measured are supplied to the circuit from a suitable pulse transmission line at input terminals 12, 13. These terminals are connected, through balanced resistors R7, R8, across primary winding 14 of pulse transformer TR2. Secondary winding 15 of the pulse transformer supplies the pulses, through series capacitor C2 and diode D5, between base 16 of transistor V3 and conductor 17 carrying the +21 volt emitter supply. Pulse transformer TR2 steps up the pulse voltage from the pulse supply line which would normally be of relatively low impedance. The pulse transformer may have for instance a primary impedance of 3.5 ohms and a secondary impedance of 5000 ohms. A typical pulse waveform passed through capacitor C2 is illustrated at 18 and comprises both a positive spike and a negative spike with a trailing edge. Diode D5 transmits only the positive spike illustrated at 19 to the base of transistor V3.

The pulses received by the circuit may vary in amplitude and waveform depending upon such factors as the kind of sensing or detecting equipment and the length and condition of the intervening transmission line. Therefore in order to count the pulses by measuring the level to which they charge a count condenser, it is necessary to regenerate them as pulses of predetermined and controlled waveform. This is done by the circuit comprising NPN transistors V3 and V4 which are connected in a monostable pulse circuit with a common emitter resistor R9 between emitters 21, 22 and positive supply conductor 17. Collector 23 of transistor V3 is connected to the negative circuit conductor or ground through load resistor R10, and is coupled to base 24 of transistor V4 through resistor R11, the coupling circuit in conjunction with resistor R12 serving to set the operating bias on base 24. The operating bias on base 16 of transistor V3 is set by the circuit including resistors R13 and R14. Collector 25 of transistor V4 is connected to ground through load resistor R15, and feedback in adjustable measure is provided from collector 25 to base 16 of transistor V3 through variable resistor R16 and capacitor C3.

The values of the circuit elements are selected in relation to the transistor characteristics to achieve a stable quiescent condition wherein transistor V3 is normally on and transistor V4 is normally biased off. A positive pulse arriving at the base of V3 causes a reduction in current through V3 whose collector transmits a negative pulse to the base of V4 causing conduction to start through V4. Conduction through V4 in turn causes feedback of a negative signal to the emitter of V3, as a result of common emitter impedance consisting of resistor R9, which further reduces current through V3. This regenerative action drives V3 to cut-off and V4 to saturation and the transistors are so maintained for a time by the positive signal coupled from the collector of V4 through R16 and C3 to the base of V3. After a predetermined time interval which can be adjusted by varying adjustable resistor R16, the charge on C3 leaks off to the point where conduction starts again in V3. Thereupon the regenerative action occurs in reverse and culminates with V3 on and V4 off. The output pulse at the collector of V4 whose substantially rectangular waveform is indicated at 26, is terminated thereby. By suitable adjustment of the combination comprising R16, C3 and R14, the output pulses are caused to have a substantially constant product of amplitude by time-duration throughout the charging cycle of the count condenser to which they are supplied.

The output pulses at the collector of V4 are supplied through diode D6 and zener diode D7 to count condenser C4 making a circuit to ground through resistor R17 to form a totalizing circuit. The count condenser charges in step-like fashion to a generally saw-tooth waveform with even increments of voltage for each pulse, as indicated by waveforms 27, 27a, which are drawn to a much longer time base than the waveforms previously referred to. The steps in each saw-tooth may occur at uneven intervals of time due to the random occurrence of the pulses being counted.

In order to obtain an accurate count, it is necessary to prevent the charge on the count condenser from leaking off during the time intervals during which transistor V4 is cut off. This is achieved through diode D6 which is selected to have an extremely high front-to-back ratio. This provides a low impedance charging path and a high impedance discharge path so that discharge of the count condenser therethrough is effectively prevented.

Also to assure an accurate count, it is necessary to prevent the collector leakage current of transistor V4 while cut off ($I_{co}$), from charging the count condenser. This is achieved through zener diode D7 which is connected for reverse conduction. A zener type semi-conductor diode has the property of presenting an extremely high impedance to reverse current flow while a voltage less than its operating value or zener point voltage is applied across it. As soon as the zener point voltage is exceeded, such a diode immediately changes its characteristics to become an extremely low impedance device. For example, the output pulses at the collector of transistor V4 represented by waveform 26 may have an amplitude of 18 to 19 volts. A zener diode having a zener point at approximately 4½ volts may be used which will immediately be converted into a low impedance element upon the application of the pulses. However in between pulses while transistor V4 is cut off, the collector leakage current ($I_{co}$) has a small value and is incapable of developing 4½ volts across the zener diode. Zener diode D7 then acts as a high impedance element and effectively prevents flow of collector leakage current into count condenser C4.

Charging pulses are periodically accumulated in count condenser C4 for predetermined time intervals, for example 60 seconds, and discharged in between. The charging and discharging cycle is governed by timer 28 driving timing cam 29 which causes switch contacts S1 to close at the end of each cycle, thereby grounding the count condenser. The switch contacts remain closed sufficiently long, for instance 1.2 seconds, to permit count condenser C4 to discharge substantially completely through current limiting resistor R17.

The voltage sensitive means responsive to the charge on the count condenser is provided by gaseous tetrode tube or thyratron V1 to whose control electrode 32 the count condenser is connected. Cathode 33 and suppressor grid 34 of V1 are connected to the junction of resistor R18 and the adjustable tap on resistor R4. The resulting positive bias on the cathode of V1 holds it cut-off until the count condenser charges sufficiently to overcome the bias and fire the tube. The firing point or setting of the count rate alarm is adjusted by varying potentiometer R4. When V1 fires, relay K1 is actuated and contactor 8 is shifted away from terminal 7 which causes red indicator lamp 6 to go on, to terminal 35 which completes a holding circuit through operating coil 10 of relay K1. The holding circuit insures that relay K1 remains actuated until manually reset and may be necessary by reason of the pulsating supply to thyratron V1 (or V2) which might allow the tube to go off. The relay also operates auxiliary contactor 36, opening the circuit between terminals 37 and 38, and closing it between terminals 37 and 39, for remote alarm indication.

The count trend is measured by transferring the voltage to which count condenser C4 is charged at the end of a charging cycle to copy condenser C5, and using the copy condenser voltage as a reference or comparison voltage during the next charging cycle or sampling. In order to accomplish this without disturbing the count rate alarm function of the system, the capacitance of the copy condenser should be a small fraction, that is, not more than a few percent of the capacitance of the count condenser. Preferably a relatively very large value of count condenser is used, for instance 250 microfarads, and a small value of copy condenser, for instance 1 microfarad. The charge is transferred by closing switch S2 momentarily just before the end of the charging cycle, the operation of the switch being governed by cam 41 driven by timer 28. Copy condenser C5 is thereby grounded and charges to the voltage of count condenser C4.

The voltage sensitive means for the trend alarm is provided by gaseous tetrode tube or thyratron V2. Both the count condenser and the copy condenser are connected in series to control electrode 42 of thyratron V2, and the voltage on the copy condenser opposes or subtracts from that on the count condenser. Cathode 43 and suppressor grid 44 of V2 are connected to the tap of potentiometer R19 which, with resistors R20 and R21 forms a voltage divider relative to the voltage supplied to the cathode of V1. In order to fire V2, the count condenser must charge sufficiently during the second cycle or sampling to overcome the negative bias provided by the copy condenser from the previous cycle or sampling, and also the positive cathode bias determined by the setting of potentiometer R19. When this occurs, V2 fires and actuates relay K1 and the alarm indicators are turned on in the same fashion as previously described with reference to the count alarm. The firing point or setting of the trend alarm is generally adjusted to allow a certain amount of positive trend or rate of increase in the count rate before the alarm is actuated.

The values or designations of circuit elements and operating conditions given in the drawing are intended as examples suitable for the preferred embodiment of the invention which has been described. Of course the preferred embodiment herein is intended as exemplary and not by way of limitation. Various modifications will readily occur to those skilled in the art, for instance in the types of tubes or transistors and in the size and ratings of the circuit elements for accommodating them. The scope of the invention is therefore to be determined by the appended claims.

What we claim as new and desire to secure by Letters Patent of the United States is:

1. A monitoring system comprising a pulse shaping circuit receiving pulses of variable waveform and providing correlated charging pulses of regulated waveform, a totalizing circuit including a count condenser accumulating said pulses for predetermined charging periods, a copy condenser having a capacitance which is but a few percent of that of said count condenser, switch means temporarily connecting said copy condenser to said count condenser in order to impart to said copy condenser the level of charge on said count condenser at the end of a charging period and for preserving it until the end of the next charging period, and voltage means responsive to the excess of charge of said count condenser over said copy condenser during said charging periods.

2. A monitoring system responsive to count rate and to count trend comprising a pulse shaping circuit receiving pulses of variable waveform and providing correlated charging pulses of regulated waveform, a totalizing circuit including a count condenser accumulating said charging pulses, a copy condenser having a capacitance which is but a few percent of that of said count condenser, switch means temporarily connecting said copy condenser to said count condenser in order to charge said copy condenser to the level of said count condenser after a predetermined charging period and for thereafter discharging said count condenser, first voltage sensitive means responsive to the charge on said count condenser, second voltage sensitive means responsive to the excess of charge of said count condenser over said copy condenser during said charging periods, and indicating means controlled by said voltage sensitive means.

3. A monitoring system responsive to count rate and to the trend in count rate comprising a monostable amplifier circuit receiving input pulses of variable waveform and providing a regenerated charging pulse of controlled product of amplitude by time-duration for each input pulse, a totalizing circuit including a count condenser connected across the output of said monostable circuit for accumulating said charging pulses, a copy condenser having a capacitance which is but a few percent of that of said count condenser, switch means temporarily connecting said copy condenser to said count condenser in order to charge said copy condenser to the level of said count condenser after a predetermined charging period and for thereafter discharging said count condenser, first voltage sensitive means responsive to the charge on said count condenser, second voltage sensitive means responsive to the excess of charge of said count condenser over said copy condenser during said charging periods, and indicating means controlled by said voltage sensitive means.

4. A monitoring system responsive to count rate and to the trend in count rate comprising a pulse shaping circuit receiving pulses of variable waveform and providing correlated charging pulses of regulated waveform at output terminals, a totalizing circuit including a diode connected for forward flow in series with a count condenser across said output terminals, said diode having a high front-to-back ratio to prevent discharge of said count condenser between charging pulses, a copy condenser having a capacitance which is but a few percent of that of said count condenser, switch means temporarily connecting said copy condenser to said count condenser in order to charge said copy condenser to the level of said count condenser after a predetermined charging period and for thereafter discharging said count condenser, first voltage sensitive means responsive to the charge on said count condenser, second voltage sensitive means responsive to the excess of charge of said count condenser over said copy condenser during said charging periods, and indicating means controlled by said voltage sensitive means.

5. A monitoring system responsive to count rate comprising a monostable transistor amplifier receiving pulses of variable time-duration and amplitude and regenerating charging pulses of regulated time-duration and amplitude at output terminals, a totalizing circuit comprising a forward flow diode, a zener diode, and a count condenser connected in series across said output terminals, said forward flow diode having a high front-to-back ratio to prevent discharge of said count condenser between charging pulses and said zener diode being connected for reverse flow to permit current flow to said count condenser during said charging pulses only, switch means for periodically discharging said count condenser after a predetermined charging period, and voltage sensitive means responsive to the charge on said count condenser.

6. A monitoring system responsive to count rate comprising a monostable transistor amplifier receiving pulses of variable time-duration and amplitude and regenerating charging pulses of regulated time-duration and amplitude at output terminals, a totalizing circuit comprising a forward flow diode, a zener diode, and a count condenser connected in series across said output terminals, said forward flow diode having a high front-to-back ratio to prevent discharge of said count condenser between charging pulses and said zener diode being connected for reverse flow to permit current flow to said count condenser during said charging pulses only, a thyratron tube having cathode, anode and control electrode, said count condenser being connected across the control electrode-cathode circuit of said thyratron, means normally biasing off said thyratron until said count condenser is charged to a preset level, switch means for periodically discharging said count condenser, and an indicator relay in the cathode-anode circuit of said thyratron tube.

7. A monitoring system responsive to count rate and to the trend in count rate comprising a monostable transistor amplifier receiving pulses of variable time-duration and amplitude and regenerating charging pulses of regulated time-duration and amplitude at output terminals, a totalizing circuit comprising a forward flow diode, a zener diode, and a count condenser connected in series across said output terminals, said forward flow diode having a high front-to-back ratio to prevent discharge of said count condenser between charging pulses and said zener diode being connected for reverse flow to permit current flow to said count condenser during said charging pulses only, first voltage sensitive means responsive to the charge on said count condenser, a first switch for discharging said count condenser, a copy condenser having a capacitance which is but a few percent of that of said count condenser, a second switch for connecting said copy condenser to said count condenser, timing means for momentarily closing said second switch after a predetermined time interval to charge said copy condenser to the level of said count condenser and for thereafter momentarily closing said first switch to discharge said count condenser, and second voltage sensitive means responsive to the excess of charge of said count condenser over said copy condenser.

8. A monitoring system responsive to count rate and to the trend in count rate comprising a monostable transistor amplifier receiving pulses of variable time-duration and amplitude and regenerating charging pulses of regulated time-duration and amplitude at output terminals, a totalizing circuit comprising a forward flow diode, a zener diode, and a count condenser connected in series across said output terminals, said forward flow diode having a high front-to-back ratio to prevent discharge of said count condenser between charging pulses and said zener diode being connected for reverse flow to permit current flow to said count condenser during said charging pulses only, a first thyratron tube having cathode, anode and control electrode, said count condenser being connected across the control electrode-cathode circuit of said first thyratron, means normally biasing off said first thyratron until said count condenser is charged to a preset level, a first switch for discharging said count condenser, a copy condenser having a capacitance which is but a few percent of that of said count condenser, a second switch for connecting said copy condenser to said count condenser, timing means for momentarily closing said second switch after a predetermined time interval to charge said copy condenser to the level of said count condenser and for thereafter momentarily closing said first switch to discharge said count condenser, a second thyratron tube having cathode, anode and control electrode, said count condenser and said copy condenser being connected in series opposition across the control electrode-cathode circuit of said second thyratron, means biasing off said second thyratron until the charge on said count condenser exceeds that on said copy condenser by a preset level, and an indicator relay in the cathode-anode circuit of said thyratron tubes.

References Cited in the file of this patent

UNITED STATES PATENTS

| | | |
|---|---|---|
| 2,411,573 | Holst et al. | Nov. 26, 1946 |
| 2,550,488 | Marsh | Apr. 24, 1951 |
| 2,645,755 | Garfield | July 14, 1953 |
| 2,683,813 | Friedman | July 13, 1954 |